US012583480B2

(12) United States Patent
Stein

(10) Patent No.: US 12,583,480 B2
(45) Date of Patent: Mar. 24, 2026

(54) METHOD AND DEVICE FOR OPERATING A DRIVERLESS EGO VEHICLE

(71) Applicant: Daimler Truck AG, Leinfelden-Echterdingen (DE)

(72) Inventor: Fridtjof Stein, Ostfildern (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 135 days.

(21) Appl. No.: 18/578,478

(22) PCT Filed: Jul. 12, 2022

(86) PCT No.: PCT/EP2022/069375
§ 371 (c)(1),
(2) Date: Jan. 11, 2024

(87) PCT Pub. No.: WO2023/285414
PCT Pub. Date: Jan. 19, 2023

(65) Prior Publication Data
US 2024/0294191 A1     Sep. 5, 2024

(30) Foreign Application Priority Data
Jul. 12, 2021     (DE) ..................... 10 2021 003 571.2

(51) Int. Cl.
*B60W 60/00*          (2020.01)
*B60W 30/09*          (2012.01)
(52) U.S. Cl.
CPC ........ *B60W 60/0017* (2020.02); *B60W 30/09* (2013.01); *B60W 2554/4045* (2020.02)

(58) Field of Classification Search
CPC ............... B60W 30/09; B60W 30/095; B60W 30/0956; B60W 60/0017; B60W 60/0027; G08G 1/163; G08G 1/166
See application file for complete search history.

(56) References Cited

U.S. PATENT DOCUMENTS 10,752,239 B2      8/2020   Duan et al.
2013/0060401 A1*   3/2013   Hahne ............... B60W 30/0956
701/1

(Continued)

FOREIGN PATENT DOCUMENTS

DE      10 2011 111 895 A1      2/2013
DE      10 2017 011 831 A1      7/2018

(Continued)

OTHER PUBLICATIONS

International Search Report (PCT/ISA/210) issued in PCT Application No. PCT/EP2022/069375 dated Oct. 31, 2022 (2 pages).

(Continued)

*Primary Examiner* — Anshul Sood
(74) *Attorney, Agent, or Firm* — Crowell & Moring LLP

(57) ABSTRACT

A method for operating a first vehicle which is a driverless ego vehicle. The method includes performing a situation analysis in the driverless ego vehicle to identify an overtaking maneuver that is being carried out by a second vehicle in which the second vehicle can no longer be expected to avoid a collision with the driverless ego vehicle and/or with a third vehicle. When the overtaking maneuver is identified, a strategy is determined for avoiding or reducing a consequence of a collision in the driverless ego vehicle depending on whether it has been identified in the situation analysis that at least one of the driverless ego vehicle, the second vehicle, and the third vehicle is manned.

10 Claims, 4 Drawing Sheets

(56)                    References Cited

U.S. PATENT DOCUMENTS

2016/0001775 A1      1/2016  Wilhelm et al.
2016/0318511 A1*  11/2016  Rangwala .............. B60Q 1/525
2017/0101102 A1*    4/2017  Matei .................. G05D 1/0259
2018/0093631 A1      4/2018  Lee et al.
2023/0271606 A1*    8/2023  Augst ................ B60W 50/087
                                                                        701/26

FOREIGN PATENT DOCUMENTS

DE        10 2017 209 533  A1      12/2018
DE        11 2017 006 845  T5      10/2019
GB                    2529578  A    *    2/2016    ............ B60W 50/14

OTHER PUBLICATIONS

German-language Office Action issued in German Application No.
10 2021 003 571.2 dated Feb. 23, 2022 (7 pages).

* cited by examiner

METHOD AND DEVICE FOR OPERATING A DRIVERLESS EGO VEHICLE

BACKGROUND AND SUMMARY OF THE INVENTION

The invention relates to a method for operating a driverless ego vehicle and a device for operating a driverless ego vehicle.

As described in DE 10 2017 011 831 A1, a method and a device for operating a self-driving vehicle are known from the prior art. The vehicle can be operated in a first operating mode provided for manned operation and in a second operating mode provided for unmanned operation, wherein, in both operating modes, a situation analysis is carried out to identify the threat of a collision with unprotected road users and wherein, in both operating modes, on identification of the threat of a collision with at least one unprotected road user, a strategy for avoiding or reducing the consequences of a collision is determined depending on the respective operating mode.

The object of the invention is to provide an improved method compared to the prior art for operating a driverless ego vehicle and an improved device compared to the prior art for operating a driverless ego vehicle.

In a method for operating a driverless vehicle, referred to hereinbelow as an ego vehicle, according to the invention, in the ego vehicle, a situation analysis is carried out to identify an overtaking maneuver being carried out by a second vehicle in which the second vehicle can no longer be expected to avoid a collision with the ego vehicle and/or with a third vehicle, wherein, on identification of this overtaking maneuver being carried out by the second vehicle, a strategy for avoiding or reducing the consequences of a collision is determined in the ego vehicle depending on whether it has been identified in the situation analysis that at least one of the vehicles that are expected to collide with one another is manned. Therefore, in addition, it is also identified in the situation analysis whether the respective vehicle expected to be involved in the collision is manned, that is to say it is at least attempted to identify whether the respective vehicle is manned or unmanned.

A device according to the invention for operating the driverless ego vehicle is configured and arranged to carry out this method.

The device comprises, in particular, a computing unit which is configured and arranged to carry out a situation analysis to identify an overtaking maneuver being carried out by a second vehicle in which the second vehicle can no longer be expected to avoid a collision with the ego vehicle and/or with a third vehicle, and to determine a strategy for avoiding or reducing the consequences of a collision on identification of this overtaking maneuver being carried out by the second vehicle depending on whether it has been identified in the situation analysis that at least one of the vehicles that are expected to collide with one another is manned.

This strategy is preferably determined in such cases in which it has been identified in the situation analysis that a collision cannot be expected to be avoided through emergency braking of the ego vehicle or through safe swerving of the ego vehicle into an available neighboring lane. Safe swerving into a neighboring lane is to be understood to mean here that neither the ego vehicle nor other road users are endangered by the swerving into the neighboring lane.

The solution described advantageously ensures that the driverless ego vehicle behaves like a responsible human vehicle operator, that is to say prioritizes the life and physical well-being of people and minimizing the severity of any injury to them and therefore avoiding or minimizing personal injury over avoiding or minimizing material damage, in particular including material damage to the ego vehicle and, for example, any load of the ego vehicle. The solution described therefore also ensures that material damage to the ego vehicle and/or to its load is accepted if the life and the health of people can thereby be saved or at least the severity of injury can be reduced, that is to say if personal injury can thereby be avoided or at least minimized. The strategy here may also comprise, for example, taking an action that causes material damage, in particular to the ego vehicle and its load, in order thereby to avoid or at least minimize personal injury, in particular including with respect to occupants in the other vehicle involved or in the plurality of other vehicles involved and including with respect to people outside the vehicles. The method therefore advantageously ensures that the driverless ego vehicle behaves in such a way that the life and the physical well-being of people is saved or at least the severity of injuries to them is minimized.

Personal injury and material damage are therefore advantageously taken into consideration in determining the strategy for avoiding or reducing the consequences of a collision, wherein, for example, damage to the environment is also expediently taken into consideration as material damage. Personal injury is given a higher weighting here, in particular a very much higher weighting, than material damage so that, in determining the strategy for avoiding or reducing the consequences of a collision, avoiding or at least minimizing personal injury is prioritized, in particular considerably prioritized, over avoiding or minimizing material damage, for example with a weighting many times higher or a weighting at least one order of magnitude or many orders of magnitude higher. In determining the strategy for avoiding or reducing the consequences of a collision here, advantageously all currently identified road users are taken into consideration, that is to say including road users, in particular people, outside the ego vehicle, the second vehicle and the third vehicle, in particular people in an area which is taken into account for the swerving of the ego vehicle, therefore in particular in an area on the edge of the road, in particular on the side next to the lane in which the ego vehicle is travelling, in particular in an area next to the road on which vehicle is travelling.

In one possible embodiment, if it has not been identified whether the respective vehicle is manned, it is assumed that it is manned. It is thereby ensured that even if it is not certain, but there is a possibility, that the respective vehicle is manned, the life and physical well-being of people and minimizing of the severity of injury to them are prioritized over material damage.

In one possible embodiment, the costs of the consequences of a collision are estimated in order to determine the strategy for avoiding or reducing the consequences of a collision. As already mentioned above, costs that are taken into consideration here are personal injury and material damage, wherein, for example, damage to the environment is also taken into consideration as material damage. For example, this consideration of costs already results in the above-described higher, in particular very much higher, weighting of personal injury over material damage since, if all costs associated therewith are taken into consideration, personal injury is usually very much more costly than material damage. For example, treatment costs and compensation can be included as personal injury costs, compensation being, for example, for pain, permanent disability, loss of earnings and compensation for surviving dependants. In one possible embodiment, for example, costs can be specified as flat-rate values for personal injury and material damage, wherein, as described above, personal injury is weighted higher, in particular very much higher, than material damage.

If the estimated costs exceed a predefined threshold, a swerving trajectory of the ego vehicle is determined, for example, as a strategy for avoiding or reducing the consequences of a collision. If the estimated costs do not exceed the predefined threshold, or if no swerving trajectory can be determined, it is determined as a strategy for avoiding or reducing the consequences of a collision, for example, that the ego vehicle slows down as much as possible, that is to say standard emergency braking is determined and carried out as a strategy, wherein the ego vehicle advantageously stays in its lane.

In one possible embodiment, if it is identified in the situation analysis that the second vehicle is overtaking the third vehicle and is approaching the ego vehicle in its lane so that a collision of the ego vehicle with the second vehicle is threatened, it is determined as a strategy for avoiding or reducing the consequences of a collision that the ego vehicle swerves away from the second vehicle, in particular swerves away to the side, in particular into the area on the edge of the road, in particular next to the lane or next to the road on which the ego vehicle is travelling in order to avoid the collision of the ego vehicle with the second vehicle. The corresponding swerving trajectory is therefore determined.

However, this is advantageously only determined as a strategy for avoiding or reducing the consequences of a collision if, as a result of this swerving of the ego vehicle, no people outside these three vehicles, in particular no people in the area on the edge of the road, are endangered, that is to say in particular only if there are no people in the area on the edge of the road. Furthermore, if it is identified that the second vehicle is unmanned and if, in addition, the ego vehicle is unmanned, this is advantageously only carried out if it is identified that the area on the edge of the road is accessible for the swerving of the ego vehicle. Otherwise, as a strategy for avoiding or reducing the consequences of a collision, it is determined that the ego vehicle stays in its own lane and slows down as much as possible, that is to say standard emergency braking is carried out.

In one possible embodiment, if it is identified in the situation analysis that the second vehicle is overtaking the ego vehicle and the third vehicle is approaching in oncoming traffic so that a collision of the third vehicle with the second vehicle is threatened, it is determined as a strategy for avoiding or reducing the consequences of a collision that the ego vehicle swerves away from the second vehicle, in particular swerves away to the side, in particular into the area on the edge of the road, in particular next to the lane in which the ego vehicle is travelling, in order thereby to enable the second vehicle to swerve out of the way and therefore avoid the collision of the third vehicle with the second vehicle. The corresponding swerving trajectory is therefore determined.

However, this is advantageously only determined as a strategy for avoiding or reducing the consequences of a collision if, as a result of this swerving of the ego vehicle, no people outside these three vehicles, in particular no people in the area on the edge of the road, are endangered, that is to say in particular only if there are no people in the area on the edge of the road. Furthermore, if it is identified that the second vehicle and the third vehicle are unmanned, this is advantageously only carried out if it is identified that the area on the edge of the road is accessible for the swerving of the ego vehicle.

For example, it is determined as a strategy for avoiding or reducing the consequences of a collision that the ego vehicle swerves into an area on the edge of the road if the second vehicle is approaching the ego vehicle in the same lane as the ego vehicle and is manned, the ego vehicle is unmanned and there are no people in the area on the edge of the road, or the second vehicle is approaching the ego vehicle in the same lane as the ego vehicle, the area on the edge of the road is accessible and there are no people in the area on the edge of the road, or the second vehicle is overtaking the ego vehicle, the second vehicle and/or the third vehicle is manned, the ego vehicle is unmanned and there are no people in the area on the edge of the road, or the second vehicle is overtaking the ego vehicle, the area on the edge of the road is accessible and there are no people in the area on the edge of the road.

This means that the corresponding swerving trajectory of the ego vehicle is determined as a strategy for avoiding or reducing the consequences of a collision in said cases.

For example, it is determined as a strategy for avoiding or reducing the consequences of a collision that the ego vehicle stays in its own lane and slows down as much as possible if the second vehicle is approaching the ego vehicle in the same lane as the ego vehicle and is unmanned, the ego vehicle is unmanned and there is at least one person in the area on the edge of the road, and/or the area on the edge of the road is not accessible.

This means that standard emergency braking of the ego vehicle is determined as a strategy for avoiding or reducing the consequences of a collision in said cases, wherein the ego vehicle advantageously stays in its lane.

It is thereby ensured that personal injury is avoided or at least reduced as a priority, and in addition material damage is advantageously also avoided or at least reduced, or, if no people are in danger, material damage is avoided or at least reduced.

Whether or not the area on the edge of the road is accessible can, for example, be determined using corresponding map data from a digital map and/or by means of a sensor system for detecting the surrounding area of the ego vehicle and/or using information which, for example, is transmitted to the ego vehicle through vehicle-to-vehicle communication and/or vehicle-infrastructure communication and/or through communication of the ego vehicle with at least one external device, in particular an information server.

Whether or not the second vehicle and/or the third vehicle is manned can, for example, be determined by means of the sensor system for detecting the surrounding area of the ego vehicle and/or using information which, for example, is transmitted to the ego vehicle through vehicle-to-vehicle communication and/or vehicle-infrastructure communication and/or through communication of the ego vehicle with at least one external device, in particular an information server.

Whether the ego vehicle is manned, if the ego vehicle has the basic capability for this, can, for example, be determined by means of a sensor system for detecting occupants of the ego vehicle, for example by means of seat occupancy detection and/or by means of at least one interior camera of the ego vehicle.

The term "manned" is to be understood, in particular, as meaning that there is at least one person, that is to say present on or in the vehicle designated as manned. This may be a driver/vehicle operator of the vehicle or any other occupant, for example a passenger. If the vehicle is unmanned, there is therefore no person on or in the vehicle.

Exemplary embodiments of the invention are explained in more detail below by reference to the drawings.

DETAILED DESCRIPTION OF THE DRAWINGS

Figure 1:
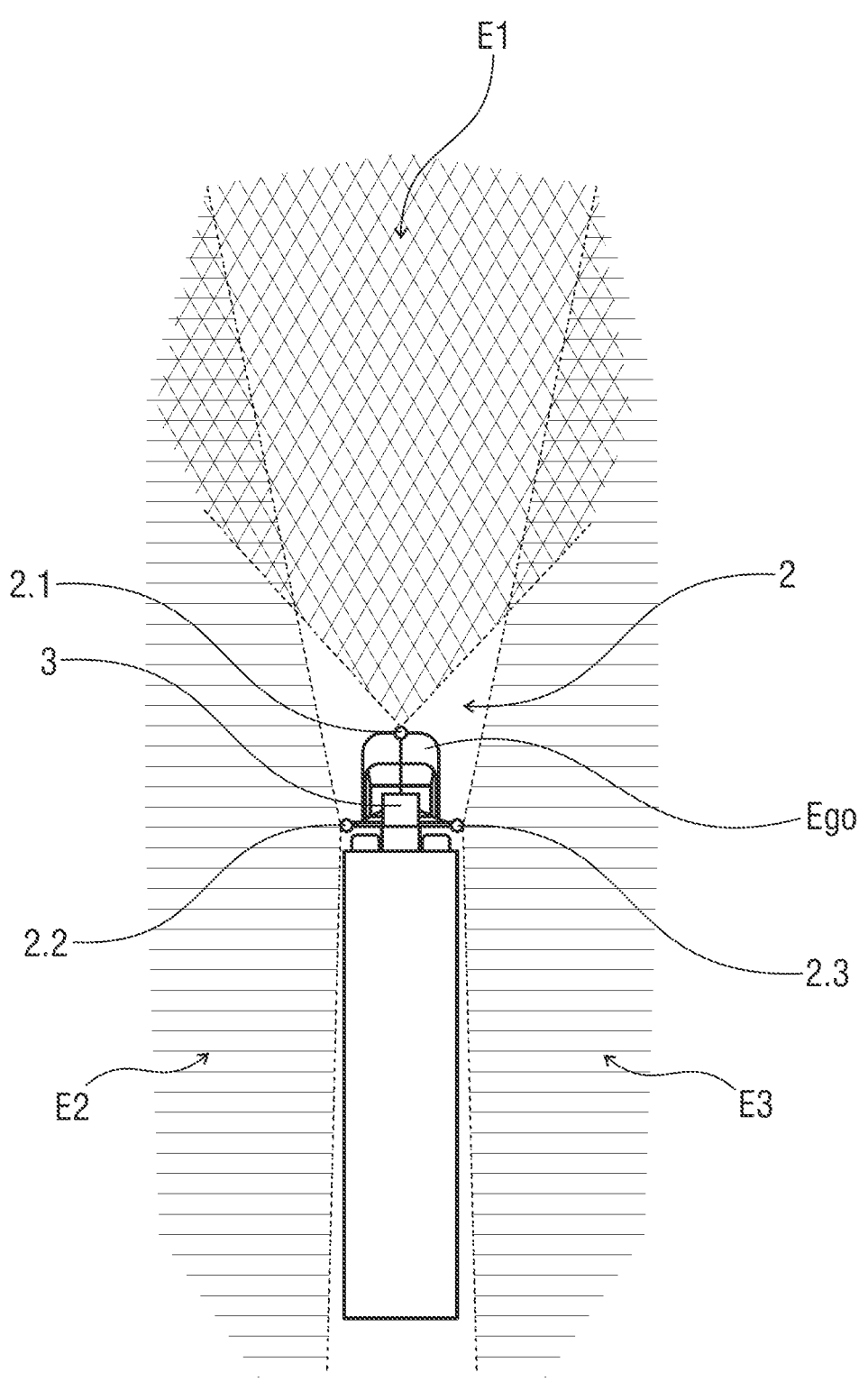
FIG. 1 schematically shows an ego vehicle in plan view from above.

Parts corresponding to one another have been provided with the same reference numerals in all of the figures.

A method and a device 1 for operating a driverless vehicle, referred to hereinbelow as an ego vehicle Ego, are described with reference to FIGS. 1 to 6 below. The ego vehicle Ego is therefore a self-driving vehicle that can be driven without the presence of a driver or vehicle operator in the ego vehicle Ego, in particular a road vehicle.

The ego vehicle Ego is shown by way of example in FIG. 1. FIGS. 2 to 5 show by way of example different traffic situations with the driverless ego vehicle Ego and FIG. 6 shows by way of example a schematic representation of the device 1.

The ego vehicle Ego is not only always driverless in the examples shown, but also unmanned, that is to say there are no passengers present as occupants in the ego vehicle Ego either. In the examples shown, the ego vehicle Ego is configured as a lorry, more precisely as an articulated lorry with a tractor unit and a trailer. In other embodiments, the ego vehicle Ego can, for example, also be configured as a different lorry, as a bus, as a passenger car, as a transporter or otherwise. For example, it may then also be provided that although the ego vehicle Ego is travelling driverlessly, there are occupants as passengers in the ego vehicle Ego, that is to say it is then not unmanned.

FIG. 1 shows the ego vehicle Ego by way of example in a schematic plan view. To carry out the driverless driving operation, the ego vehicle Ego comprises a sensor system 2 for detecting the surrounding area with at least one surrounding area detection sensor 2.1, 2.2, 2.3 or advantageously, as shown here, a plurality of surrounding area detection sensors 2.1, 2.2, 2.3. The respective surrounding area detection sensor 2.1, 2.2, 2.3 is, for example, configured as a lidar sensor, radar sensor or as a camera, for example a stereo camera. As described and shown in FIG. 1, a plurality of surrounding area detection sensors 2.1, 2.2, 2.3 are advantageously provided. Provision may be made here for a plurality of identical surrounding area detection sensors 2.1, 2.2, 2.3 or combinations of one or a plurality of surrounding area detection sensors 2.1, 2.2, 2.3 of one type with one or a plurality of surrounding area detection sensors 2.1, 2.2, 2.3 of at least one other type.

FIG. 1 also schematically shows detection areas E1, E2, E3 of the surrounding area detection sensors 2.1, 2.2, 2.3. In the example shown, these extend to an area in front of the ego vehicle Ego and to in each case an area on the side next to the ego vehicle Ego.

The ego vehicle Ego further has a computing unit 3. The computing unit 3 is a component of the device 1 shown in FIG. 6. For example, the sensor system 2 for detecting the surrounding area is also a component of this device 1. In particular, the computing unit 3 is configured and arranged to carry out the method.

The driverless ego vehicle Ego advantageously locates itself by means of its sensor system 2 for detecting the surrounding area and using map data from a digital map LK in a respectively available transport infrastructure and advantageously adapts its driving behavior to other road users detected and, in particular, measured, in particular, by means of its sensor system 2 for detecting the surrounding area.

Figure 2:
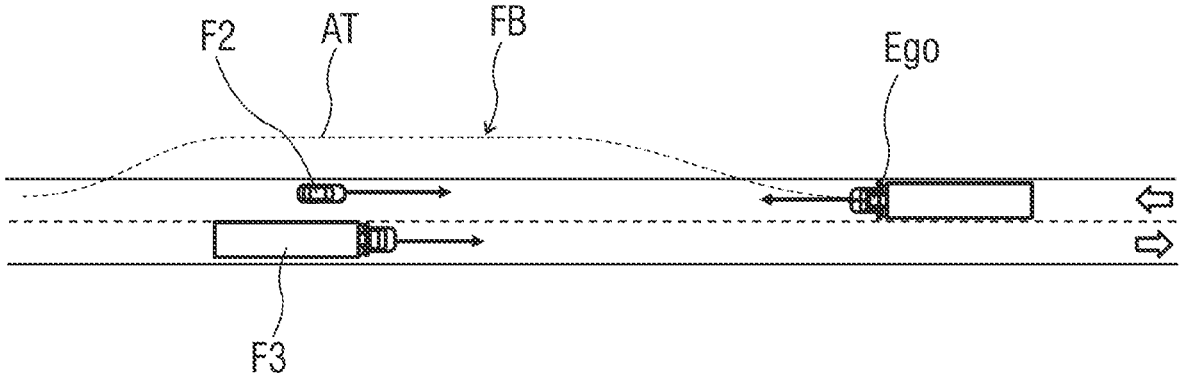
FIG. 2 schematically shows a traffic situation with the ego vehicle from FIG. 1 and a second vehicle approaching the ego vehicle and overtaking a third vehicle.
Figure 3:
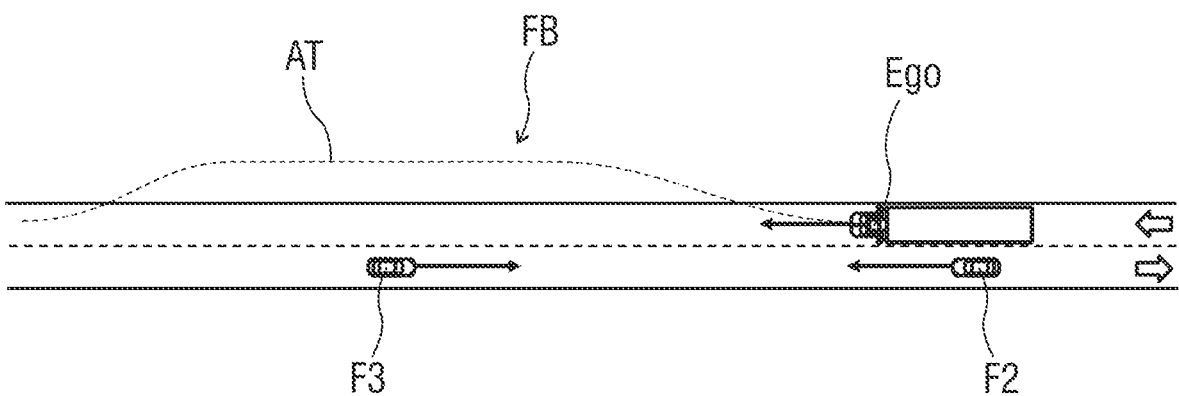
FIG. 3 schematically shows a traffic situation with the ego vehicle from FIG. 1 and a second vehicle overtaking the ego vehicle in oncoming traffic.
Figure 4:
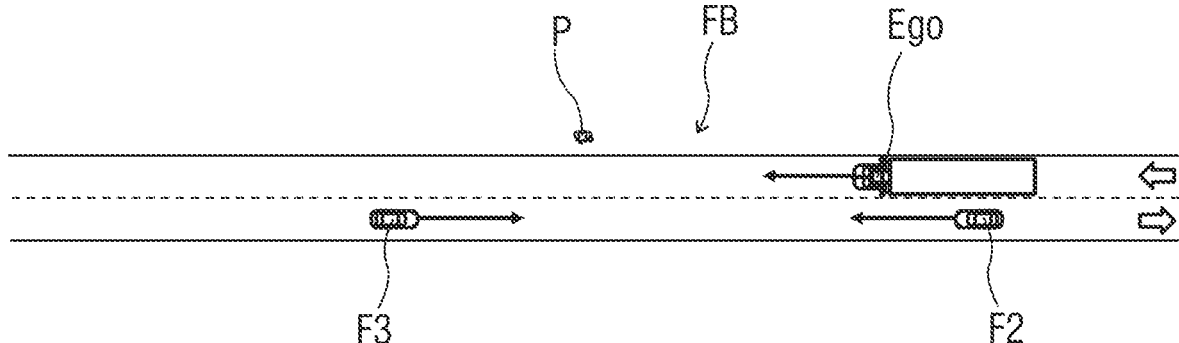
FIG. 4 schematically shows a traffic situation with the ego vehicle from FIG. 1, a second vehicle overtaking the ego vehicle in oncoming traffic and a person in an area on the edge of the road adjoining a lane in which the ego vehicle is travelling.
Figure 5:
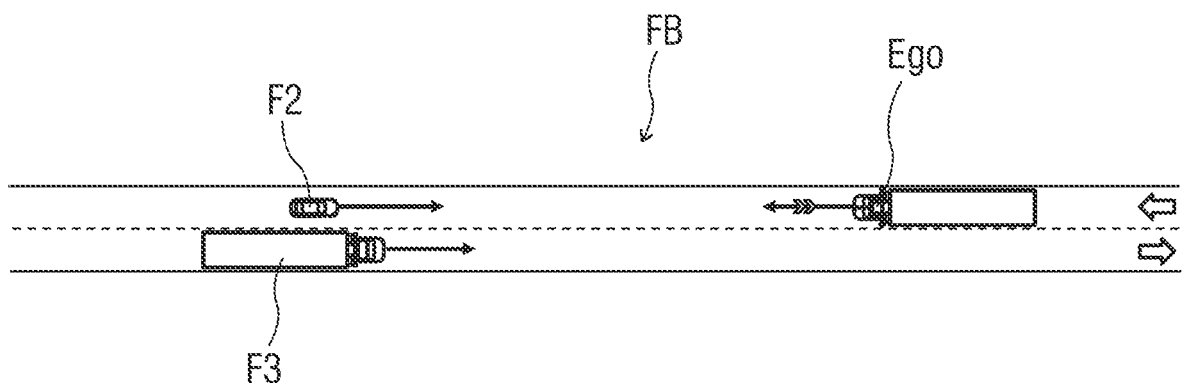
FIG. 5 schematically shows a further traffic situation with the ego vehicle from FIG. 1 and a second vehicle approaching the ego vehicle and overtaking a third vehicle.
Figure 6:
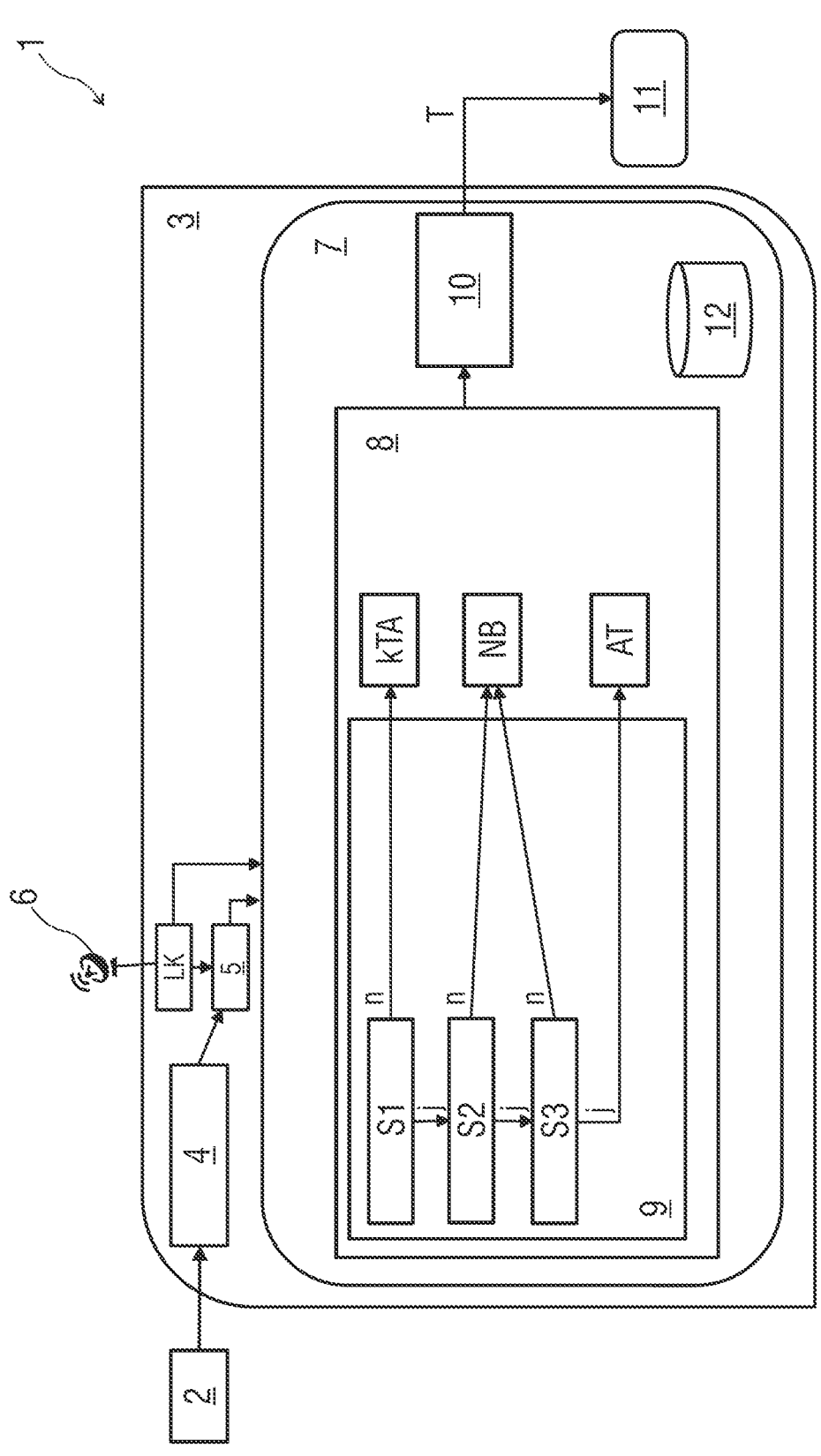
FIG. 6 schematically shows a device for operating a driverless ego vehicle.

During this driverless driving operation of the ego vehicle Ego, as shown by way of example using different traffic situations in FIGS. 2 to 5, dangerous overtaking maneuvers may be carried out by other vehicles F2, F3 on roads with oncoming traffic, by a second vehicle F2 in the examples shown here, wherein the ego vehicle Ego is being overtaken by the second vehicle F2, as shown in FIGS. 3 and 4, or a third vehicle F3 approaching the ego vehicle Ego and being overtaken by the second vehicle F2, as shown in FIGS. 2 and 5.

So that the ego vehicle Ego responds correctly in such traffic situations, provision is made in the method for operating the driverless ego vehicle Ego described here that, in the ego vehicle Ego, a situation analysis is carried out to identify an overtaking maneuver being carried out by a second vehicle F2 in which the second vehicle F2 can no longer be expected to avoid a collision with the ego vehicle Ego and/or with a third vehicle F3. If this is the case, that is to say on identification of this overtaking maneuver being carried out by the second vehicle F2, a strategy for avoiding or reducing the consequences of a collision is determined in the ego vehicle Ego. In principle, the strategy provides for the ego vehicle Ego to commence emergency braking if it can thereby avoid a collision, or for it to change to a possibly available neighboring lane if the change can be made safely and a collision can thereby be avoided. The method described here deals with traffic situations in which a collision cannot be avoided in this way. In such cases, the strategy and therefore its determination are dependent on whether it has been identified in the situation analysis that at least one of the vehicles Ego, F2, F3 that are expected to collide with one another is manned.

The method ensures that the driverless ego vehicle Ego behaves like a responsible human vehicle operator, that is to say prioritizes the life and physical well-being of people and minimizing the severity of any injury to them and therefore avoiding or minimizing personal injury over avoiding or minimizing material damage, in particular including material damage to the ego vehicle Ego and for example any load of the ego vehicle Ego. The method therefore also ensures that material damage to the ego vehicle Ego and/or to its load is accepted if the life and the health of people can thereby be saved or at least the severity of injury can be reduced, that is to say if personal injury can thereby be avoided or at least minimized. The strategy here may also comprise, for example, taking an action that causes material damage, in particular to the ego vehicle Ego and its load, in order thereby to avoid or at least minimize personal injury. The method therefore advantageously ensures that the driverless ego vehicle Ego behaves in such a way that the life and the physical well-being of people is saved or at least the severity of the injuries to them is minimized.

Personal injury and material damage are therefore advantageously taken into consideration in determining the strategy for avoiding or reducing the consequences of a collision, wherein, for example, damage to the environment is also expediently taken into consideration as material damage. Personal injury is given a higher weighting here, in particular a very much higher weighting, than material damage so that, in determining the strategy for avoiding or reducing the consequences of a collision, avoiding or at least minimizing personal injury is prioritized, in particular considerably prioritized, over avoiding or minimizing material damage, for example with a weighting many times higher or a weighting at least one order of magnitude or many orders of magnitude higher. In determining the strategy for avoiding or reducing the consequences of a collision here, advantageously all currently identified road users are taken into consideration, that is to say including road users, in particular people P, outside the ego vehicle Ego, the second vehicle F2 and the third vehicle F3, in particular people P in an area which is taken into account for the swerving of the ego vehicle Ego, therefore, in particular, in an area on the edge of the road FB, in particular on the side next to the lane in which the ego vehicle Ego is travelling, in particular on the side or next to the road on which ego vehicle Ego is travelling.

For example, if it has not been identified whether the respective vehicle F2, F3 is manned, provision can be made for it to be assumed that it is manned. It is thereby ensured that even if it is not certain, but there is a possibility, that the respective vehicle F2, F3 is manned, the life and physical well-being of people and minimizing of the severity of injury to them are prioritized over material damage.

For example, the costs of the consequences of a collision are determined in order to determine the strategy for avoiding or reducing the consequences of a collision. If the determined costs exceed a predefined threshold, a swerving trajectory AT is determined, for example, as a strategy for avoiding or reducing the consequences of a collision. If the determined costs do not exceed the predefined threshold, or if no swerving trajectory AT can be determined, it is determined as a strategy for avoiding or reducing the consequences of a collision, for example, that the ego vehicle Ego slows down as much as possible, that is to say standard emergency braking NB is carried out, and advantageously stays in its lane here.

For example, if it is identified in the situation analysis that the second vehicle F2 is overtaking the third vehicle F3 and is approaching the ego vehicle Ego in its lane so that a collision of the ego vehicle Ego with the second vehicle F2 is threatened, it is determined as a strategy for avoiding or reducing the consequences of a collision that the ego vehicle Ego swerves away from the second vehicle F2, in particular swerves away to the side, in particular into the area on the edge of the road FB, in particular next to the lane, in particular next to the road on which the ego vehicle Ego is travelling in order to avoid the collision of the ego vehicle Ego with the second vehicle F2, as shown in FIG. 2. The corresponding swerving trajectory AT is therefore determined.

However, this is advantageously only determined as a strategy for avoiding or reducing the consequences of a collision if, as a result of this swerving of the ego vehicle Ego, no people P outside these three vehicles Ego, F2, F3, in particular no people P in the area on the edge of the road FB, are endangered, that is to say in particular only if there are no people P in the area on the edge of the road FB. Furthermore, if it is identified that the second vehicle F2 is unmanned, and if, in addition, the ego vehicle Ego is unmanned, this is advantageously only carried out if it is identified that the area on the edge of the road FB is accessible for the swerving of the ego vehicle Ego. Otherwise, as a strategy for avoiding or reducing the consequences of a collision, it is determined that the ego vehicle Ego stays in its own lane and slows down as much as possible, that is to say standard emergency braking NB is carried out.

For example, if it is identified in the situation analysis that the second vehicle F2 is overtaking the ego vehicle Ego and the third vehicle F3 is approaching in oncoming traffic so that a collision of the third vehicle F3 with the second vehicle F2 is threatened, it is determined as a strategy for avoiding or reducing the consequences of a collision that the ego vehicle Ego swerves away from the second vehicle F2, in particular swerves away to the side, in particular into the area on the edge of the road FB, in particular next to the lane in which the ego vehicle Ego is travelling, in order thereby to enable the second vehicle F2 to swerve out of the way and therefore avoid the collision of the third vehicle F3 with the second vehicle F2, as shown in FIG. 3. The corresponding swerving trajectory AT is therefore determined.

However, this is advantageously only determined as a strategy for avoiding or reducing the consequences of a collision if, as a result of this swerving of the ego vehicle Ego, no people P outside these three vehicles Ego, F2, F3, in particular no people P in the area on the edge of the road FB, are endangered, that is to say, in particular, only if there are no people P in the area on the edge of the road FB. Furthermore, if it is identified that the second vehicle F2 and the third vehicle F3 are unmanned, this is advantageously only carried out if it is identified that the area on the edge of the road FB is accessible for the swerving of the ego vehicle Ego.

The method is explained below by reference to the traffic situations according to FIGS. 2 to 5.

In the traffic situation according to FIG. 2, the second vehicle F2 is overtaking the third vehicle F3 and approaching the ego vehicle Ego in its lane. The situation analysis to identify this overtaking maneuver being carried out by the second vehicle F2 in which the second vehicle F2 can no longer be expected to avoid the collision with the ego vehicle Ego, is carried out in the ego vehicle Ego and the latter therefore identifies this overtaking maneuver being carried out by the second vehicle F2. It is identified in the situation analysis that there is no possibility of the second vehicle F2 being able to end the overtaking maneuver and also of the collision of the second vehicle F2 with the ego vehicle Ego any longer being able to be avoided by the second vehicle F2 and the ego vehicle Ego slowing down as much as possible. It is further identified in the situation analysis that the second vehicle F2, at least with very high probability, is manned, or it is assumed that the second vehicle F2 is manned. There is therefore the great danger that the second vehicle F2 will collide with the ego vehicle Ego with a very high probability of fatal consequences for occupants in the second vehicle F2. The ego vehicle Ego is unmanned, as already mentioned.

Then, depending on whether it has been identified in the situation analysis or it is assumed that the second vehicle F2 is manned, the strategy for avoiding or reducing the consequences of a collision is determined in the ego vehicle Ego. In the example shown, this strategy is the swerving trajectory AT of the ego vehicle Ego over the area on the edge of the road FB on the side next to the lane in which the ego vehicle Ego is travelling in order to thereby swerve out of the way of the approaching second vehicle F2. In other words, it is determined as a strategy for avoiding or reducing the consequences of a collision that the ego vehicle Ego swerves into the area on the edge of the road FB, in particular since there are no people P in the area on the edge of the road FB who might be endangered by this swerving of the ego vehicle Ego. On determination of this strategy for avoiding or reducing the consequences of a collision, that is to say on determination of this swerving trajectory AT, it is insignificant whether the area on the edge of the road FB is accessible or not since the ego vehicle Ego is unmanned. The possibility of the ego vehicle Ego and/or its load incurring material damage is therefore accepted in order thereby to avoid personal injury of the occupants of the second vehicle F2.

In the traffic situation according to FIG. 3, the second vehicle F2 is overtaking the ego vehicle Ego and thereby approaching the third vehicle F3 in oncoming traffic in its lane. The situation analysis to identify this overtaking maneuver being carried out by the second vehicle F2 in which the second vehicle F2 can no longer be expected to avoid the collision with the third vehicle F3, is carried out in the ego vehicle Ego and the latter therefore identifies this overtaking maneuver being carried out by the second vehicle F2. It is identified in the situation analysis that there is no possibility of the second vehicle F2 being able to end the overtaking maneuver, that the ego vehicle Ego can no longer slow down sufficiently to allow the second vehicle F2 to get back into lane in time ahead of the ego vehicle Ego, and that the second vehicle F2 can no longer slow down sufficiently to get back into lane behind the ego vehicle Ego. It is further identified in the situation analysis that the second vehicle F2 and/or the third vehicle F3, at least with very high probability, is manned, or it is assumed that the second vehicle F2 and/or the third vehicle F3 is manned. There is therefore the great danger that the second vehicle F2 will collide with the third vehicle F3 with a very high probability of fatal consequences for occupants in the second vehicle F2 and/or in the third vehicle F3. The ego vehicle Ego is unmanned, as already mentioned.

Then, depending on whether it has been identified in the situation analysis or it is assumed that the second vehicle F2 and/or the third vehicle F3 is manned, the strategy for avoiding or reducing the consequences of a collision is determined in the ego vehicle Ego. In the example shown, this strategy is the swerving trajectory AT of the ego vehicle Ego over the area on the edge of the road FB on the side next to the lane in which the ego vehicle Ego is travelling in order thereby to enable the second vehicle F2 to swerve out of the way. In other words, it is determined as a strategy for avoiding or reducing the consequences of a collision that the ego vehicle Ego swerves into the area on the edge of the road FB, in particular since there are no people P in the area on the edge of the road FB who might be endangered by this swerving of the ego vehicle Ego. The second vehicle F2 can thereby swerve out of the way of the third vehicle F3 into the previous lane in which the ego vehicle Ego was travelling. On determination of this strategy for avoiding or reducing the consequences of a collision, that is to say on determination of this swerving trajectory AT, it is insignificant whether the area on the edge of the road FB is accessible or not since the ego vehicle Ego is unmanned. The possibility of the ego vehicle Ego and/or its load incurring material damage is therefore accepted in order thereby to avoid personal injury of the occupants of the second vehicle F2.

If it is identified in the situation analysis in the traffic situation according to FIG. 3 that the second vehicle F2 and the third vehicle F3 are unmanned and that the area on the edge of the road FB on the side next to the lane in which the ego vehicle Ego is travelling is accessible, the strategy for avoiding or reducing the consequences of a collision in the form of the swerving trajectory AT of the ego vehicle Ego over the area on the edge of the road FB on the side next to the lane in which the ego vehicle Ego is travelling is likewise advantageously determined in the ego vehicle Ego in order thereby to allow the second vehicle F2 to swerve out of the way. In other words, it is determined as a strategy for avoiding or reducing the consequences of a collision that the ego vehicle Ego swerves into the area on the edge of the road FB, in particular since there are no people P in the area on the edge of the road FB who might be endangered by this swerving of the ego vehicle Ego. The second vehicle F2 can thereby swerve out of the way of the third vehicle F3 into the previous lane in which the ego vehicle Ego was travelling. Material damage with respect to the second and third vehicles F2, F3 is thereby avoided and material damage to the ego vehicle Ego is not to be feared owing to the accessibility of the area on the edge of the road FB.

The traffic situation according to FIG. 4 is similar to the traffic situation according to FIG. 3, that is to say the second vehicle F2 is overtaking the ego vehicle Ego and thereby approaching the third vehicle F3 in oncoming traffic in its lane. The situation analysis to identify this overtaking maneuver being carried out by the second vehicle F2 in which the second vehicle F2 can no longer be expected to avoid the collision with the third vehicle F3, is carried out in the ego vehicle Ego and the latter therefore identifies this overtaking maneuver being carried out by the second vehicle F2. It is identified in the situation analysis that there is no possibility of the second vehicle F2 being able to end the overtaking maneuver, that the ego vehicle Ego can no longer slow down sufficiently to allow the second vehicle F2 to get back into lane in time ahead of the ego vehicle Ego, and that the second vehicle F2 can no longer slow down sufficiently to get back into lane behind the ego vehicle Ego. The person P in the area on the edge of the road FB on the side next to the lane in which the ego vehicle Ego is travelling is now also identified in the situation analysis. It is also identified in the situation analysis that the second vehicle F2 and/or the third vehicle F3, at least with very high probability, is manned, or it is assumed that the second vehicle F2 and/or the third vehicle F3 is manned.

The strategy for avoiding or reducing the consequences of a collision is then determined in the ego vehicle Ego. The swerving trajectory AT over the area on the edge of the road FB on the side next to the lane in which the ego vehicle Ego is travelling is ruled out here since this would endanger the person P in the area on the edge of the road FB. It is assumed here that, even if it is identified in the situation analysis that the second vehicle F2 and/or the third vehicle F3 is manned, these occupants are better protected by the respective vehicle F2, F3, in particular by its passive occupant protection devices, and by energy absorption possibilities of the second vehicle F2 and of the third vehicle F3, than the unprotected person P in the area on the edge of the road FB in the event of a collision with the ego vehicle Ego. As a strategy for avoiding or reducing the consequences of a collision, it is therefore determined that the ego vehicle Ego stays in its own lane, that is to say does not follow any swerving trajectory AT, and therefore does not swerve into the area on the edge of the road FB on the side next to the lane in which the ego vehicle Ego is travelling.

The traffic situation according to FIG. 5 is similar to the traffic situation according to FIG. 2, that is to say the second vehicle F2 is overtaking the third vehicle F3 and approaching the ego vehicle Ego in its lane. The situation analysis to identify this overtaking maneuver being carried out by the second vehicle F2 in which the second vehicle F2 can no longer be expected to avoid the collision with the ego vehicle Ego, is carried out in the ego vehicle Ego and the latter therefore identifies this overtaking maneuver being carried out by the second vehicle F2. It is detected in the situation analysis that there is no possibility of the second vehicle F2 being able to end the overtaking maneuver and also of the collision of the second vehicle F2 with the ego vehicle Ego any longer being able to be avoided by the second vehicle F2 and the ego vehicle Ego slowing down as much as possible. However, it is now also identified in the situation analysis that the second vehicle F2 is unmanned. As already mentioned, the ego vehicle Ego is also unmanned. This is also identified in the situation analysis. There is therefore the great danger that the second vehicle F2 will collide with the ego vehicle Ego, but without the probability of fatal consequences since there are no occupants either in the second vehicle F2 or in the ego vehicle Ego. It is also identified in the situation analysis that the area on the edge of the road FB on the side next to the lane in which the ego vehicle Ego is travelling is not accessible.

Then, depending on whether it has been identified in the situation analysis that the second vehicle F2 and the ego vehicle Ego are manned, the strategy for avoiding or reducing the consequences of a collision is determined in the ego vehicle Ego. In the example shown, this strategy is for the ego vehicle Ego to stay in its lane and for the ego vehicle Ego to slow down as much as possible. Material damage which is caused by the collision of the ego vehicle Ego with the second vehicle F2 is thereby minimized. Personal injury is not caused since the vehicles Ego, F2 colliding with each other are unmanned. On the other hand, in the event of swerving into the inaccessible area on the edge of the road FB, greater material damage, in particular to the ego vehicle Ego and/or its load, would have to be expected.

If it is identified in this traffic situation shown in FIG. 5 that the area on the edge of the road FB on the side next to the lane in which the ego vehicle Ego is travelling is accessible, the strategy for avoiding or reducing the consequences of a collision is likewise determined in the ego vehicle Ego depending on whether it has been identified in the situation analysis that the second vehicle F2 and the ego vehicle Ego are unmanned. This strategy is now the swerving trajectory AT of the ego vehicle Ego over the area on the edge of the road FB on the side next to the lane in which the ego vehicle Ego is travelling in order to thereby swerve out of the way of the approaching second vehicle F2. In other words, it is determined as a strategy for avoiding or reducing the consequences of a collision that the ego vehicle Ego swerves into the area on the edge of the road FB now identified as accessible, in particular since there are no people P in the area on the edge of the road FB who might be endangered by this swerving of the ego vehicle Ego. In this way, the collision of the second vehicle F2 with the ego vehicle Ego and the resulting material damage can be avoided, and no material damage is to be feared through this swerving of the ego vehicle Ego either owing to the accessibility of the area on the edge of the road FB on the side next to the lane in which the ego vehicle Ego is travelling.

If, although it is identified in this traffic situation shown in FIG. 5 that the area on the edge of the road FB on the side next to the lane in which the ego vehicle Ego is travelling is accessible, a person P is nevertheless identified therein, then it is expediently determined as a strategy for avoiding or reducing the consequences of a collision for the ego vehicle Ego to stay in its lane and for the ego vehicle Ego to slow down as much as possible since swerving into the side area on the edge of the road FB would endanger the person P. In this case too, this would expediently be determined as a strategy even if the second vehicle F2 were manned since it is to be assumed that the occupants in the second vehicle F2 are better protected than the unprotected person P in the area on the edge of the road FB.

Whether or not the area on the edge of the road FB is accessible can, for example, be determined using corresponding map data from the digital map LK and/or by means of the sensor system 2 for detecting the surrounding area of the ego vehicle Ego and/or using information which, for example, is transmitted to the ego vehicle Ego through vehicle-to-vehicle communication and/or vehicle-infrastructure communication and/or through communication of the ego vehicle Ego with at least one external device, in particular an information server.

Whether or not the second vehicle F2 and/or the third vehicle F3 is manned can, for example, be determined by means of the sensor system 2 for detecting the surrounding area of the ego vehicle Ego and/or using information which, for example, is transmitted to the ego vehicle Ego through vehicle-to-vehicle communication and/or vehicle-infrastructure communication and/or through communication of the ego vehicle Ego with at least one external device, in particular an information server.

Whether the ego vehicle Ego is manned, if the ego vehicle Ego has the basic capability for this, can, for example, be determined by means of a sensor system for detecting occupants of the ego vehicle Ego, for example by means of seat occupancy detection and/or by means of at least one interior camera of the ego vehicle Ego.

In order to decide, for the strategy for avoiding or minimizing the consequences of a collision, whether the swerving trajectory AT should be planned and the ego vehicle Ego should follow this swerving trajectory AT, that is to say whether the ego vehicle Ego should swerve to the side, in particular into the area on the edge of the road FB on the side next to the lane in which the ego vehicle Ego is travelling, or whether the ego vehicle Ego should only slow down as much as possible, that is to say should carry out standard emergency braking NB, a determination of costs is advantageously carried out and it is checked whether the costs determined are higher than a predefined threshold. As described above, personal injury and material damage are taken into consideration for the determination of costs. For personal injury, for example, it is taken into consideration whether people involved will very probably die or, for example, be injured. For example, the severity of any injury that is highly likely to occur is also taken into consideration here. Material damage to the ego vehicle Ego, to its load and, for example, additionally damage to the environment and material damage to the other road users involved, in particular to the second vehicle F2 and third vehicle F3, for example, are taken into consideration as material damage. For example, whether dangerous materials might be damaged is also taken into consideration here.

If the costs that are determined do not exceed the predefined threshold, the strategy determined and carried out for avoiding or minimizing the consequences of a collision is for the ego vehicle Ego to slow down as much as possible, that is to say standard emergency braking NB is determined and carried out as the strategy.

If the costs that are determined exceed the predefined threshold, as a strategy for avoiding or minimizing the consequences of a collision, it is checked whether the swerving trajectory AT is possible and, if it is possible, this swerving trajectory AT is used, that is to say the strategy determined for avoiding or minimizing the consequences of a collision is the swerving of the ego vehicle Ego, in particular to the side, in particular over the area on the edge of the road FB on the side next to the lane in which the ego vehicle Ego is travelling. If this is not possible, that is to say if no swerving trajectory AT can be determined, the strategy determined and carried out for avoiding or minimizing the consequences of a collision here too is for the ego vehicle Ego to slow down as much as possible, that is to say standard emergency braking NB is determined and carried out as the strategy.

FIG. 6 shows the device 1 for operating the driverless ego vehicle Ego. It is configured and arranged to carry out the method described. The ego vehicle Ego comprises this device 1.

The device 1 comprises the computing unit 3 already mentioned, the digital map LK, a sensor processing system 4 and a data fusion system 5. The sensor processing system 4 receives sensor information from the sensor system 2 for detecting the surrounding area of the ego vehicle Ego and processes it. A current position of the ego vehicle Ego is determined by means of a position determination unit 6 of the ego vehicle Ego and the digital map LK, for example through a global navigation satellite system. The data fusion 5 of the sensor information processed by the sensor processing system 4 and the current position of the ego vehicle Ego is then carried out. Both the fused data and the current position of the ego vehicle Ego are fed to a behavior and planning module 7 of the computing unit 3.

The described situation analysis and planning of the described strategy for avoiding or reducing the consequences of a collision are carried out therein in a corresponding situation analysis and planning module 8. In an extreme scenario module 9, the described traffic situations in which an overtaking maneuver by the second vehicle F2 in which the second vehicle F2 can no longer be expected to avoid a collision with the ego vehicle Ego and/or with the third vehicle F3, is identified and analysed in order to determine the strategy for avoiding or reducing the consequences of a collision.

In a first step S1, it is checked whether such a traffic situation, that is to say an overtaking maneuver carried out by the second vehicle F2 in which the second vehicle F2 can no longer be expected to avoid a collision with the ego vehicle Ego and/or with the third vehicle F3, has been identified. If not n, no trajectory adaptation kTA is carried out, that is to say no strategy for avoiding or reducing the consequences of a collision is determined. A trajectory T determined in some other way to carry out the driverless driving operation of the ego vehicle Ego is then expediently maintained.

If so y, that is to say if in the first step S1 an overtaking maneuver carried out by the second vehicle F2 in which the second vehicle F2 can no longer be expected to avoid a collision with the ego vehicle Ego and/or with the third vehicle F3, has been identified, then, in a second step S2, a determination of the costs of the consequences of a collision is carried out and it is checked whether the costs that are determined are higher than a predefined threshold. As described above, personal injury and material damage are taken into consideration for the determination of costs. For personal injury, for example, it is taken into consideration whether people involved will very probably die or, for example, be injured. For example, the severity of any injury that is highly likely to occur is also taken into consideration here. Material damage to the ego vehicle Ego, to its load and, for example, additionally damage to the environment and material damage to the other road users involved, in particular to the second vehicle F2 and third vehicle F3, for example, are taken into consideration as material damage. For example, whether dangerous materials might be damaged is also taken into consideration here.

If this check as to whether the costs that are determined are higher than the predefined threshold reveals that they are not n, then slowing down of the ego vehicle Ego as much as possible is determined as a strategy for avoiding or reducing the consequences of a collision, that is to say standard emergency braking NB of the ego vehicle Ego in order to reduce the consequences of a collision.

If this check as to whether the costs that are determined are higher than the predefined threshold reveals that they are y, then it is checked in a third step S3 whether the swerving trajectory AT of the ego vehicle Ego is possible as a strategy for avoiding or reducing the consequences of a collision, that is to say the swerving of the ego vehicle Ego, in particular into the area on the edge of the road FB on the side next to the lane in which the ego vehicle Ego is travelling. If not n, that is to say if this is not possible, then slowing down of the ego vehicle Ego as much as possible is determined as a strategy for avoiding or reducing the consequences of a collision, that is to say standard emergency braking NB of the ego vehicle Ego in order to reduce the consequences of a collision. If so y, that is to say if the swerving trajectory AT is possible, then the swerving trajectory AT determined is applied, that is to say used for the driverless driving operation of the ego vehicle Ego.

The respective result of the extreme scenario module 9 is transmitted to a trajectory generator 10 of the behavior and planning module 7 and used for trajectory generation. The generated trajectory T is then transmitted to an actuator system 11 of the ego vehicle Ego and used there to carry out the driverless driving operation. The actuator system 11, also referred to as an actuator, comprises, in particular, a steering device, a braking device and a drive chain of the ego vehicle Ego.

The computing unit 3, in particular its behavior and planning module 7, advantageously further comprises a data recording system 12 in which all relevant data of the described method and the described procedure in the device 1 are recorded. This is important for any subsequent judicial and police investigation and analysis. In particular if damage to the second and third vehicles F2, F3 and their occupants could be avoided through the strategy for avoiding or reducing the consequences of a collision, but damage was caused to the ego vehicle Ego thereby, this data recording system 12 is very important for proving who was originally responsible for this damage and therefore has to provide compensation for it.

The invention claimed is:

1. A method for operating a driverless first vehicle, comprising:

identifying that an overtaking maneuver is being carried out by a second vehicle in which the second vehicle cannot be expected to avoid a collision with the first vehicle and/or with a third vehicle;

determining a strategy for reducing a consequence of the collision, wherein the strategy depends on whether the vehicles involved in the collision are determined to be manned; and executing the strategy via a driverless driving operation of the first vehicle.

2. The method of claim 1, wherein determining the strategy is in response to identifying that the collision cannot be expected to be avoided through emergency braking of the first vehicle or safe swerving of the first vehicle into an available neighboring lane.

3. The method of claim 1, wherein the first vehicle is assumed to be manned when it has not been determined whether the first vehicle is manned, wherein the second vehicle is assumed to be manned when it has not been determined whether the second vehicle is manned, and wherein the third vehicle is assumed to be manned when it has not been determined whether the third vehicle is manned.

4. The method of claim 1, wherein determining the strategy considers personal injury and material damage, and wherein personal injury is weighted more than material damage.

5. The method of claim 1, wherein determining the strategy includes estimating a cost of the consequence of the collision.

6. The method of claim 5, wherein the strategy includes:

determining a swerving trajectory for the first vehicle when the cost exceeds a predefined threshold; and slowing down the first vehicle as much as possible when the cost does not exceed the predefined threshold or when no swerving trajectory is determinable.

7. The method of claim 1, wherein the strategy includes swerving the first vehicle into an area on an edge of a road in each of the following scenarios:

the second vehicle is approaching the first vehicle in a same lane as the first vehicle and is manned, the first vehicle is unmanned, and there are no people in the area on the edge of the road, the second vehicle is approaching the first vehicle in the same lane as the first vehicle, the area on the edge of the road is accessible, and there are no people in the area on the edge of the road, the second vehicle is overtaking the first vehicle, the second vehicle and/or the third vehicle is manned, the first vehicle is unmanned, and there are no people in the area on the edge of the road, and the second vehicle is overtaking the first vehicle, the area on the edge of the road is accessible, and there are no people in the area on the edge of the road.

8. The method of claim 1, wherein the strategy includes the first vehicle staying in its own lane and slowing down as much as possible when the second vehicle is approaching the first vehicle in a same lane as the first vehicle and is unmanned, the first vehicle is unmanned, and at least one of:

there is at least one person in an area on an edge of the road, and the area on the edge of the road is not accessible.

9. A device for operating a driverless first vehicle, wherein the device is configured to perform the method of claim 1.

10. The device of claim 9, further comprising:

a computing unit configured to perform a situation analysis in which the overtaking maneuver is identified.

* * * * *